United States Patent
Gumpoltsberger et al.

(10) Patent No.: US 7,267,022 B2
(45) Date of Patent: Sep. 11, 2007

(54) MULTISTEP TRANSMISSION OF A LAYSHAFT TYPE

(75) Inventors: Gerhard Gumpoltsberger, Friedrichshafen (DE); Jens Patzner, Potsdam (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 88 days.

(21) Appl. No.: 11/208,502

(22) Filed: Aug. 22, 2005

(65) Prior Publication Data

US 2006/0048593 A1   Mar. 9, 2006

(30) Foreign Application Priority Data

Sep. 8, 2004  (DE) .................... 10 2004 043 387

(51) Int. Cl.
*F16H 3/08*   (2006.01)
(52) U.S. Cl. .................... 74/331; 74/325; 74/329; 74/340; 384/461
(58) Field of Classification Search ........... 74/325, 74/329, 330, 331, 340; 384/461, 571, 901
See application file for complete search history.

(56) References Cited

U.S. PATENT DOCUMENTS 4,738,149 A * 4/1988 Janiszewski ............... 74/330
5,390,558 A * 2/1995 Weinberg ................... 74/124
6,050,152 A * 4/2000 Alfredsson .................. 74/325
6,595,077 B1 * 7/2003 Geiberger et al. ........... 74/330
7,044,013 B2 * 5/2006 Ahrens ...................... 74/331

FOREIGN PATENT DOCUMENTS

DE         43 30 170 A1    3/1995

* cited by examiner

*Primary Examiner*—David D. Le
(74) *Attorney, Agent, or Firm*—Davis Bujold & Daniels, P.L.L.C.

(57) ABSTRACT

A multi-speed transmission of countershaft design having a main countershaft and a hollow countershaft arranged concentrically and having likewise two load-shift elements. A first half of the shift elements is connected with a drive unit and a second half of the shift elements is connected to a gearbox input shaft. The gearbox input shafts and countershafts are mounted in a housing and connected to gear wheels, which intermesh in pairs as gear wheel pairs and can be connected or disconnected in order to reduce the overall gear ratio in the power flow. The main countershaft is mounted directly on the housing in the area of its first end and in the hollow countershaft in the area of its second end. The hollow countershaft is mounted in the housing in the area of its end that faces toward the end of the main countershaft that is mounted in the hollow countershaft.

12 Claims, 3 Drawing Sheets

MULTISTEP TRANSMISSION OF A LAYSHAFT TYPE

This application claims priority from German Application Serial No. 10 2004 043 387.9 filed Sep. 8, 2004.

FIELD OF THE INVENTION

The invention concerns a multi-speed transmission of countershaft design, in particular a double clutch transmission.

BACKGROUND OF THE INVENTION

A six-speed double clutch transmission is known from DE 43 30 170 C2, which is configured with a so-called double clutch on the side of the gearbox input, which consists of two friction-locked shift elements. A drive torque of a drive motor that is applied on a motor shaft according to a transmission capacity adjusted in the respective shift elements is conducted to a first main gearbox input shaft or to a second gearbox input shaft mounted on the main gearbox input shaft and configured as a hollow shaft. The two gearbox input shafts are connected torsion-resistant to a respective gear wheel and these gear wheels mesh, in turn, with gear wheels that are respectively connected torsion-resistant to a countershaft. The two countershafts are arranged concentrically with respect to each other, whereupon a countershaft configured as a hollow shaft is mounted on a further main countershaft.

In order to adjust the different gear ratios, the six-speed, double clutch transmission is configured with further gear wheel pairs that can be connected via synchronizations, wherein the respectively adjusted overall gear transmission is forwarded according to the converted drive torque of the power plant, via a gearbox output shaft, that is arranged coaxially with respect to the gearbox inlet.

It is disadvantageous here, however, that the high gearing forces that are actively connected with the gear wheel pairs in the area of the countershaft that is configured as a hollow shaft (and which will be called the hollow countershaft below), which are caused by the different gear ratios of the gear wheel pairs between the gearbox input shafts and the countershaft, must be transferred via the bearing between the hollow countershaft and the main countershaft or main countershaft gear if there is a differential speed and, in addition, the forces that are conducted toward the main hollow countershaft must be introduced into the housing via the bearing mechanisms of the main countershaft within the housing if there is a renewed speed difference. This arrangement is characterized by unfavorable load characteristic values that have, as a consequence, a short service life of the gearbox, which is undesirable from the point of view of the operating costs of a motor vehicle over its entire service life.

It is, therefore, an object of the invention to furnish a multi-speed transmission of countershaft design, which has advantageous load characteristic values as well as a long service life.

SUMMARY OF THE INVENTION

The multi-speed transmission of countershaft design, in accordance with the invention, has two concentrically arranged countershafts and two load-shift elements, wherein a first half of the shift elements is in active connection with a respective drive unit and a second half of the shift elements is connected to a corresponding gearbox input shaft and of the gearbox input. The gearbox input shafts and the countershafts are mounted in a housing and are actively connected with each other, via gear wheels, which intermesh in pairs as gear wheel pairs and can be connected torsion-resistant and disconnected in order to reduce the overall gear ratio in the power flow. This transmission design has advantageous load characteristic values and long service life resulting therefrom.

This is achieved by mounting a main first countershaft, via a first bearing mechanism, directly in the housing in the area of its first end and mounting a second countershaft that is configured as a hollow shaft, via a second bearing mechanism, and a third bearing mechanism in the area of its second end, while mounting hollow countershaft directly in the housing, via a fourth bearing mechanism, in the area end that faces toward the end of the main countershaft that is mounted in the hollow countershaft.

The particular advantage of the solution proposed, according to the invention, results from the fact that the high radial and tangential forces of the gear wheel pairs, between the hollow countershaft and the gearbox input shafts as well as between the hollow countershaft and the gearbox output shaft, can be transferred directly into the housing of the multi-speed transmission, via the third bearing mechanism.

Furthermore, the bearing forces of the fourth bearing mechanism, acting in radial direction, can be transferred directly, that is, essentially without lever arm and thereby without additional obliquely positioning the hollow countershaft with respect to the third bearing mechanism, whereby a bearing load of the third bearing mechanism is low.

Further advantages also result with regard to the installation of the multi-speed transmission, according to the invention, based on the solution proposed by the invention, since initially the main countershaft and the hollow countershaft can be preassembled. A gear wheel that is arranged between the gearbox input and the third and fourth bearing mechanism and is connected torsion-resistant to the main countershaft is only connected to the main countershaft at a later time. The hollow countershaft is inserted, via the free end of the main countershaft, and then both countershafts are installed in a housing part of the multi-speed transmission. The aforementioned gear wheel is subsequently installed on the main countershaft, if the housing part that supports the third bearing mechanism is installed.

In addition, the bearing concept of the multi-speed transmission, according to the invention, offers advantages with regard to the configuration of the gearbox housing, since the third bearing mechanism and a fixed bearing of a gearbox input shaft, configured as a main gearbox input shaft, can be positioned in a mutual bearing plane and can be installed advantageously in a bearing plate from the point of view of costs and installation space.

BRIEF DESCRIPTION OF THE DRAWINGS

The invention will now be described, by way of example, with reference to the accompanying drawings where, for the purpose of a better overview, the same reference characters are assigned in the description of the embodiments to those components that are identical with respect to their design and function in which.

DETAILED DESCRIPTION OF THE INVENTION

Figure 1:
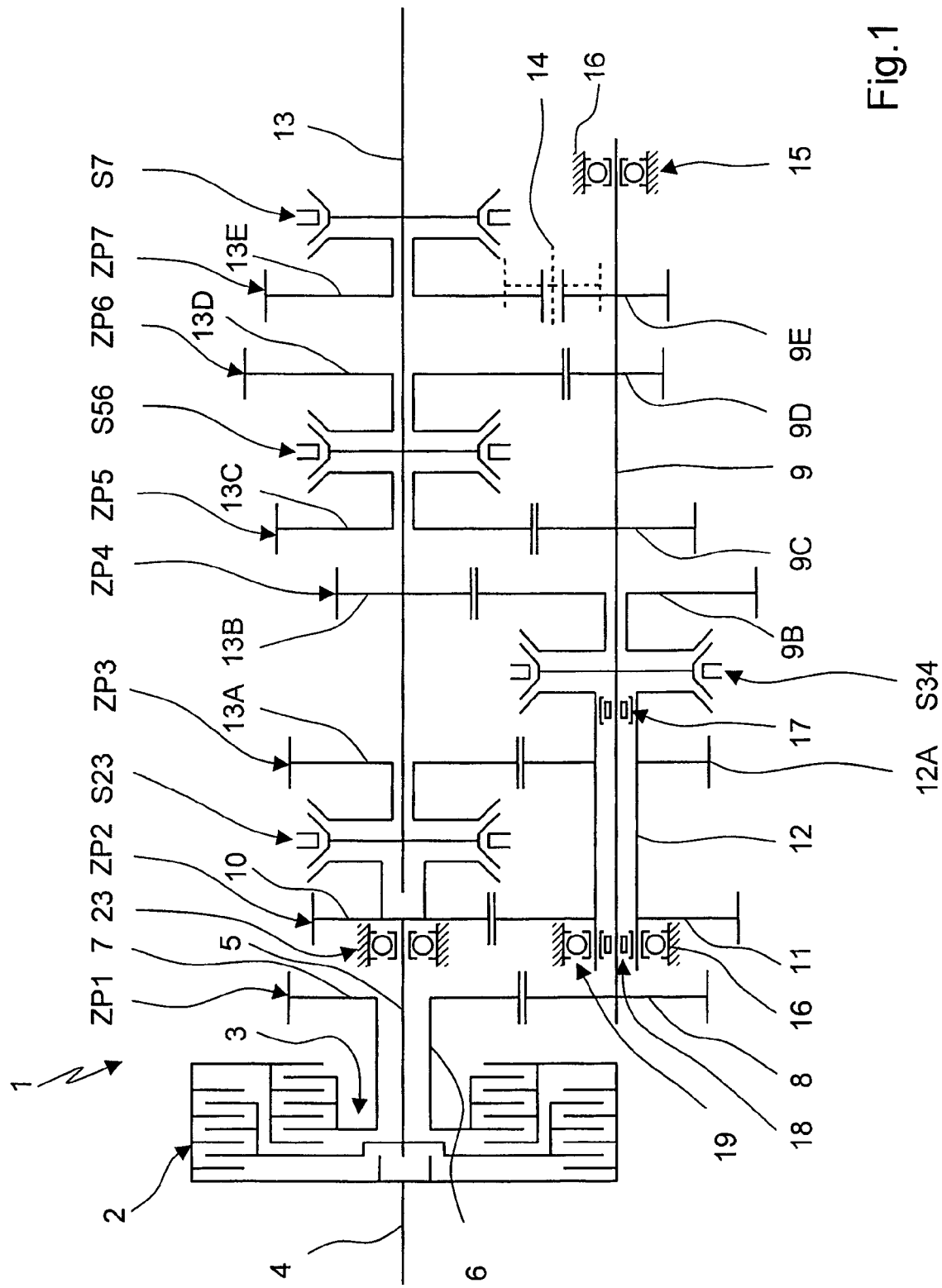
FIG. 1 shows a wheel schematic of a first embodiment of a multi-speed transmission in accordance with the invention.

FIG. 1 shows a multi-speed transmission 1 of countershaft design, which has two load-shift elements 2, 3 on the side of the gearbox input, via which a torque applied via an engine shaft 4 can be selectively conducted to a main gearbox input shaft 5 or a second gearbox input shaft 6 arranged concentrically with respect to the main gearbox input shaft 5 and arranged thereon and executed as a hollow shaft.

The second load-shift element 3 is arranged radially within the first load-shift element 2, so that the mult-ispeed transmission 1 has a shorter length in the axial direction than with the load-shift elements arranged side by side, while the radially telescoping arrangement of the load-shift elements 2, 3, shown in FIG. 1, enlarges the dimensions of the multi-speed transmission 1 at the gearbox input in peripheral direction, in comparison with the load-shift elements arranged side by side.

The second gearbox input shaft, configured as hollow shaft or the hollow gearbox input shaft 6, is connected torsion-resistant to a first gear wheel 7, which is configured as a spur gear and meshes with a second gear wheel 8, which is likewise configured as a spur wheel. The gear wheel 8 is connected torsion-resistant to a main countershaft or main countershaft gear 9, which essentially extends over the entire length of the multispeed transmission.

The main gearbox input shaft or the gearbox main input shaft 5 is connected torsion-resistant to a third gear wheel 10 that meshes with a fourth gear wheel 11, which is connected torsion-resistant to a second countershaft configured as a hollow shaft or to a hollow countershaft 12 that is mounted on the main countershaft 9.

A gearbox output shaft 13 arranged coaxially with respect to the main gearbox input shaft 5 as well as the engine shaft 4 supports several gear wheels 13A to 13E, which mesh with gear wheels 12A and 9B to 9E of the hollow countershaft 12 or the main countershaft 9, so that the multi-speed transmission 1 is configured with seven gear wheel pairs ZP1 to ZP7.

In order to be able to represent the different gear ratio steps of the multi-speed transmission 1, which is configured as a so-called double clutch transmission, four shift elements S23, S34, S56 and S7, configured as synchronizations, are also provided, through which the gear wheel pairs ZP3, ZP4, ZP5, ZP6 and ZP7 can be connected with or disconnected therefrom in the power flow of the multi-speed transmission 1 can be connected or disconnected. In addition, the main gearbox input shaft 5 and the gearbox output shaft 13 can be interconnected torsion-resistant, via the synchronization S23, so that a direct drive through with the gearbox overall transmission "1" can be represented.

A further gear wheel 14, which is represented in dotted lines in FIG. 1, in addition, is provided in the area of the gear wheel pairs ZP7 between the gear wheel 9E that is connected torsion-resistant to the main countershaft and the gear wheel 13E that is configured as an idle gear and is arranged on the gearbox output shaft 13, so that a reversal of the rotation direction occurs at the gearbox output shaft 13 when the gear wheel pair ZP7 is connected, and a reverse driving stage is available when the multi-speed transmission 1 is used in the motor vehicle.

The main countershaft 9 is mounted in a housing 16 of the multi-speed transmission 1, which is shown highly schematized in FIG. 1, via a first bearing mechanism 15 in the area of its end that faces the gearbox output, wherein the first bearing mechanism 15 represents herein a bearing that can absorb radial forces as well as axial forces acting in the direction of the gearbox input or the gearbox output, and can be supported in the housing 16.

In addition, the main countershaft 9 is mounted in the hollow countershaft 12, via a second bearing mechanism 17 and a third bearing mechanism 18, in the area of its second end that faces the gearbox input, wherein the forces that act herein can be transferred to the hollow countershaft 12 fundamentally merely in radial direction toward the main countershaft 9, via the second bearing mechanism 17 and the third bearing mechanism 18.

The hollow countershaft 12 is mounted directly, via a fourth bearing mechanism 19 in the housing 16 of the multi-speed transmission 1, in the area of its second end mounted in the hollow countershaft 12 that faces the main countershaft 9, wherein the fourth bearing mechanism 19 can absorb radial forces as well as also axial forces like the first bearing mechanism 15, and can be supported in the housing 16.

The first bearing mechanism 15 and the fourth bearing mechanism 19 are configured as fixed bearings in the embodiment shown in FIG. 1, for example, as deep groove ball bearings, double angular contact ball bearings, four-point contact bearings, double conical roller bearings or the like, whereas the second bearing mechanism 17 and the third bearing mechanism 18 are configured as a floating bearing, such as, a needle bearing, cylindrical roller bearing or the like, for example.

Figure 2:
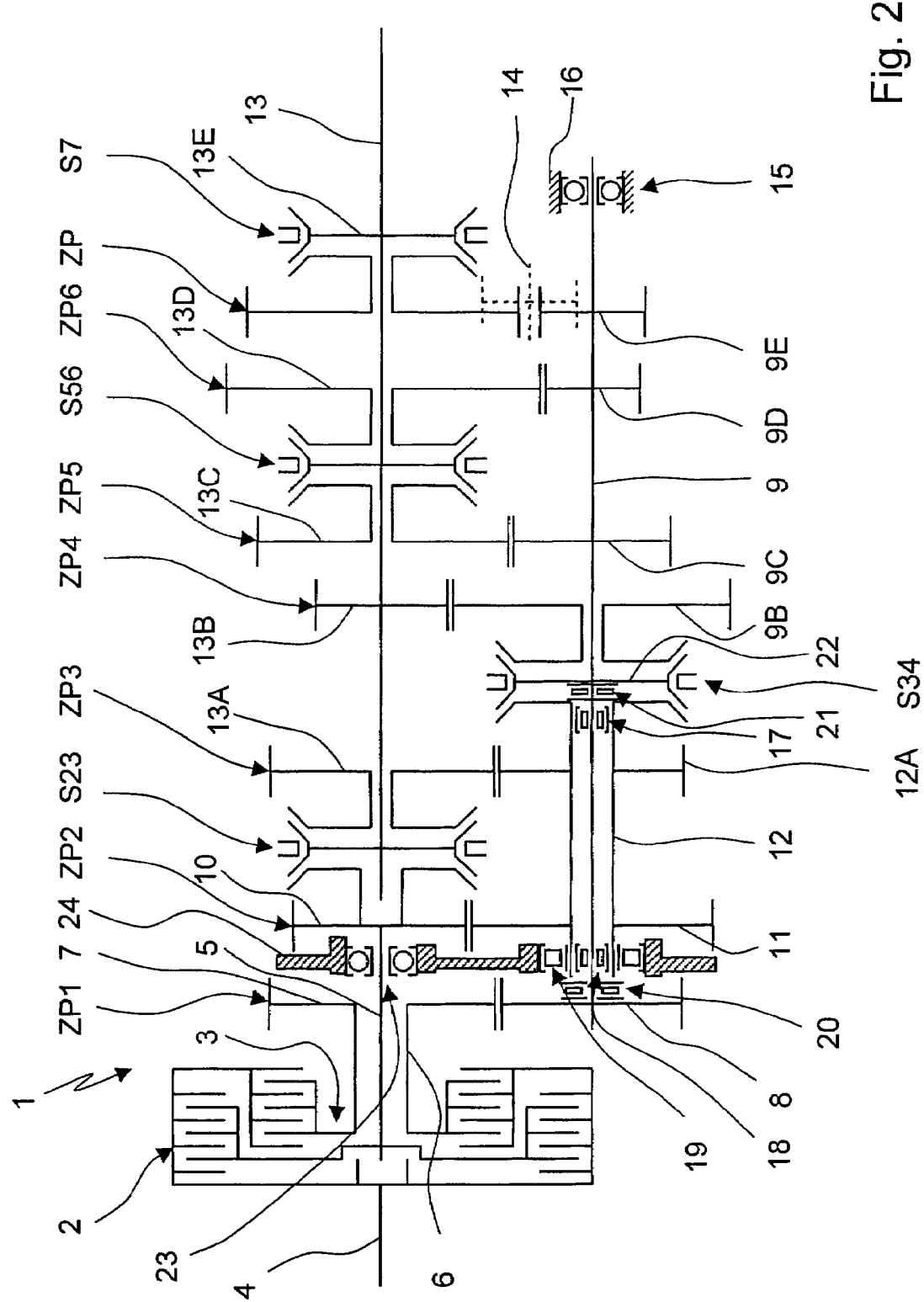
FIG. 2 shows a wheel schematic of a second embodiment of a multi-speed transmission in accordance with the invention.

A second embodiment of the multi-speed transmission 1, according to the invention, is depicted in FIG. 2 that differs from the embodiment of the multi-speed transmission 1 shown in FIG. 1, merely in the area of the bearing mechanisms of the hollow countershaft 12 in the housing 16 for which reason only the differences will be dealt with in the description below.

In the multi-speed transmission 1, shown in FIG. 2, the fourth bearing mechanism 19 is also configured as a floating bearing where, in order to support the axial forces that act on the hollow countershaft 12 are provided, in addition, two thrust bearing mechanisms 20, 21, by which the axial forces that act on the hollow countershaft 12 can be introduced into the main countershaft 9. The thrust bearing mechanisms 20 and 21 are configured as deep-groove ball thrust bearings and can be configured as needle bearings, thrust bearings or the like in dependence upon the respective application case in other embodiments of the multi-speed transmission of the invention, which are not shown in detail.

The first thrust bearing mechanism 20 is arranged between the second gear wheel 8 that is connected torsion-resistant to the main countershaft 9 and the end of the hollow countershaft 12 that faces the second gear wheel 8. The second thrust bearing mechanism 21 is positioned between an element 22 of the synchronization that is connected torsion-resistant to the main countershaft 9 and the end of the hollow countershaft 12 that faces the synchronization 34. In this way, the axial forces acting in the direction of the gearbox input on the hollow countershaft 12 are introduced into and supported in the main countershaft 9 via the first thrust bearing mechanism 20 and the second gear wheel 8 and into the housing 16 of the multi-speed transmission 1, via the first bearing mechanism 15, configured as a fixed bearing. The axial forces that act in the direction of the gearbox output on the hollow countershaft 12 are introduced and supported via the second thrust bearing mechanism 21 into the main countershaft 9 and therewith into the housing 16 of the multi-speed transmission 1.

The embodiment of the multi-speed transmission 1, shown in FIG. 2, has a lesser installation space requirement in radial direction in the area of the fourth bearing mechanism 19 in comparison with the multi-speed transmission 1, shown in FIG. 1, since the fourth bearing mechanism 19, configured as a floating bearing in FIG. 2, has smaller dimensions in radial direction than the fixed bearing of the embodiment, shown in FIG. 1. In addition, less installation space is also required in the axial direction in the area of the fourth bearing mechanism 19, in accordance with FIG. 2, because the axial safeguard of the fourth bearing mechanism 19 in accordance with FIG. 1 in the housing 16 which is required with the embodiment as a fixed bearing, is omitted.

Figure 3:
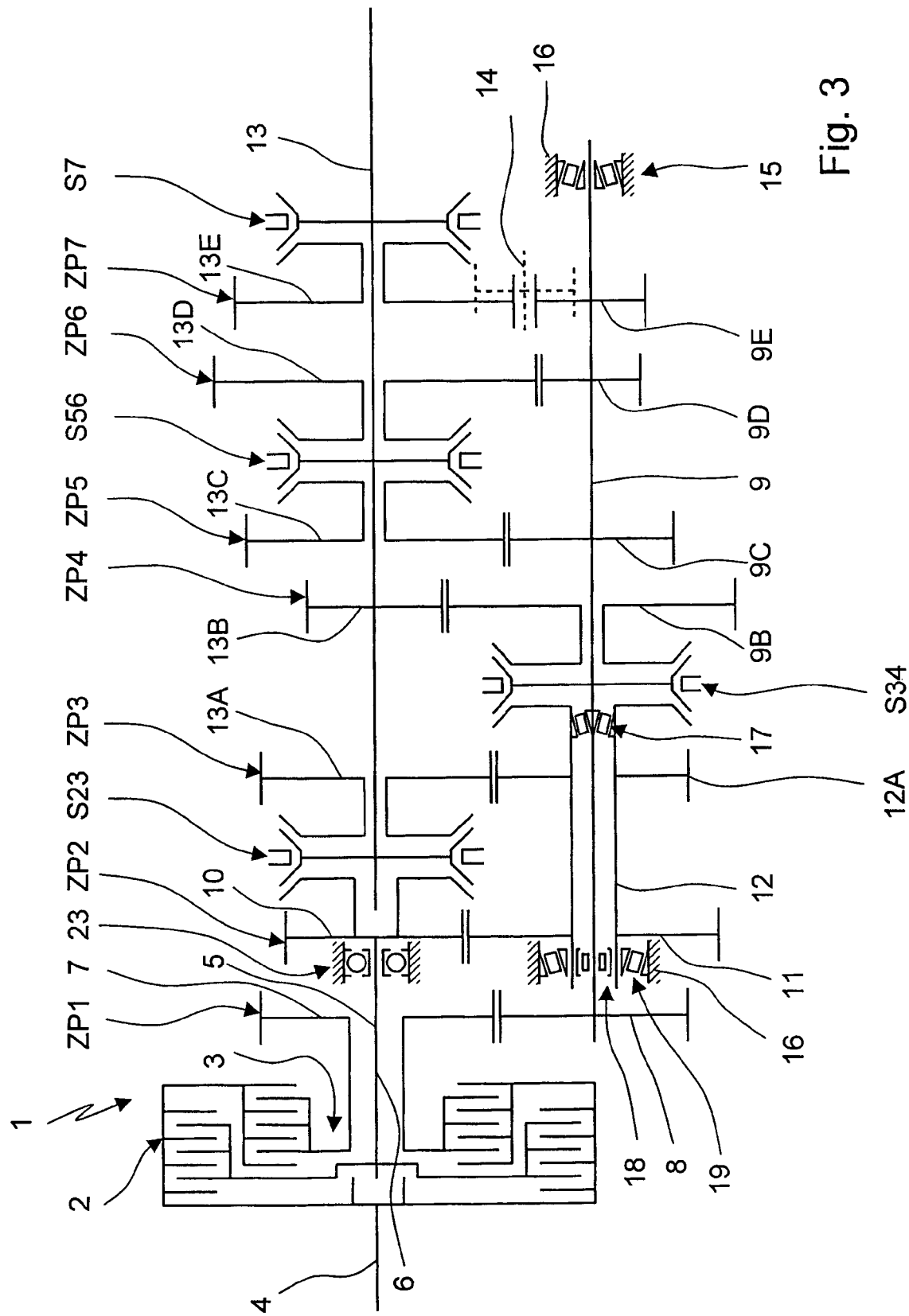
FIG. 3 shows a wheel schematic of a third embodiment of a multi-speed transmission in accordance with the invention.

Another embodiment of the multispeed transmission 1, according to the invention, is shown in FIG. 3, which deviates from the embodiments shown in FIGS. 1 and 2, in which the first bearing mechanism 15, the second bearing mechanism 17, and the fourth bearing mechanism 19, respectively, are configured as so-called angular contact bearings that can absorb radial forces as well as axial forces acting in a specific direction. Since the embodiment of a multi-speed transmission 1, according to the invention, is shown in FIG. 3, differs merely in the area of the bearings of the main countershaft 9 and the hollow countershaft 12 from the embodiments shown in FIG. 1 and FIG. 2, only the differences with respect to the description of FIG. 2 will be discussed in further detail in the description of FIG. 3.

The third bearing mechanism 18 is configured as a floating bearing in the multi-speed transmissions in accordance with FIGS. 1 and 2, so that merely the radial forces can be transferred via the third bearing mechanism 18. The first bearing mechanism 15 is configured in such a way that radial forces, as well as axial forces directed in the direction of the gearbox output by the first bearing mechanism 15 that is configured as a conical ball bearing, can be supported in the housing 16 of the multi-speed transmission 1. The fourth bearing mechanism 19 is, likewise, configured as a conical roller bearing and supports radial forces as well as axial forces that act in the direction of the gearbox input on the main countershaft 9 or the hollow countershaft 12 in the housing of the multi-speed transmission 1.

In order that the axial forces, acting on the main countershaft 9 in the direction of the gearbox input or acting on the hollow countershaft 12 in the direction of the gearbox output, can be supported in the housing 16, the second bearing mechanism 17, which is, likewise, configured as a conical roller bearing, is configured in such a way that the axial forces acting via the first bearing mechanism 15 or via the fourth bearing mechanism 19, that cannot be supported in the housing, can be forwarded by the main countershaft 9 to the hollow countershaft 12 or in reversed direction by the hollow countershaft 12 to the main countershaft 9 and can then be supported via the first bearing mechanism 15 or via the fourth bearing mechanism 19 in the housing 16.

It is, of course, within the discretion of the expert, to configure the first bearing mechanism 15, the second bearing mechanism 17 and the fourth bearing mechanism 19, depending on the respectively existing application case, differently from the configuration as a conical roller bearing, also as an angular contact ball bearing or the like, in order to be able to fulfill the demands placed on the bearing mechanisms.

In all three embodiments of the mult-speed transmission 1 in accordance with the invention that are shown in the drawing, the fourth bearing mechanism 19 and a fixed bearing 23 of the main gearbox input shaft 5 are arranged on a mutual bearing plane, whereby considerable advantages result in the configuration of the housing 16 of the multi-speed transmission 1, since the fourth bearing mechanism 19 and the fixed bearing 23 can be arranged on a mutual bearing plate 24, which is shown in more detail in FIG. 2. The fixed bearing 23 is arranged between the first gear wheel pair ZP1 and the second gear wheel pair ZP2 directly on the main gearbox input shaft 5 and is configured preferably as a deep groove ball bearing or the like.

In a further development of the embodiment of the multi-speed transmission 1, shown in FIG. 2, it is provided that the hollow countershaft is not supported via the two thrust bearing mechanisms on the main countershaft in the manner shown in FIG. 2, but directly on the housing of the multi-speed transmission 1, whereby a load of the first bearing mechanism 15 is lowered in axial direction and the first bearing mechanism 15 can be dimensioned smaller.

The invention claimed is:

1. A multi-speed transmission (1), of countershaft design for a double clutch transmission, having a main countershaft (9) and a hollow countershaft (12) arranged concentrically thereto, and having two load-shift elements (2, 3), in which a first half of the load-shift elements (2, 3) is in active connection with a drive unit and a second half of the load-shift elements (2, 3) is connected to respective first and second gearbox input shafts (5, 6), and the first and the second gearbox input shafts (5, 6) and the main and the hollow countershafts (9, 12) are mounted in a housing (16) and are actively connected to gear wheels (7, 8, 9B to 9E, 10, 11, 12A, 13A to 13E), which respectively intermesh in pairs as gear wheel pairs (ZP1 to ZP7) and can be either connected or disconnected in order to reduce an overall gear ratio of a power flow, the main countershaft (9) is mounted directly on the housing (16) via a first bearing mechanism (15) in an area of a first end and in the hollow countershaft (12) via a second bearing mechanism (17) and a third bearing mechanism (18) in an area of a second end, while the hollow countershaft (12) is mounted directly in the housing (16) via a fourth bearing mechanism (19) in an area end that faces toward the second end of the main countershaft (9) that is mounted in the hollow countershaft (12), the first gearbox input shaft has a fixed gear wheel which permanently meshes with a fixed gear wheel of the hollow countershaft (12), the second gearbox input shaft (6) has a fixed gear wheel which permanently meshes with a fixed gear wheel of the main countershaft (9), and the hollow countershaft (12) and the main countershaft (9) each has at least one fixed gear which permanently meshes with respective gear wheels of a gearbox output shaft (13).

2. The multi-speed transmission according to 1, wherein the first bearing mechanism (15) and the fourth bearing mechanism (19) are fixed bearings and the second bearing mechanism (17) and the third bearing mechanism (18) are floating bearings.

3. The multi-speed transmission according to claim 1, wherein the hollow countershaft (12) is actively connected via a second gear wheel pair (ZP2) directly to the first gearbox input shaft (5) and the main countershaft (9) is in active connection via a first gear wheel pair (ZP1) directly with the second gearbox input shaft (6).

4. The multi-speed transmission according to claim 1, wherein the gearbox output shaft (13) is arranged coaxially with respect to the gearbox input shafts (5,6).

5. The multi-speed transmission according to 1, wherein the first bearing mechanism (15) is a fixed bearing and the second bearing mechanism (17), the third bearing mechanism (18), and the fourth bearing mechanism (19) are all floating bearings.

6. The multi-speed transmission according to 5, wherein the hollow countershaft (12) is additionally supported in an axial direction on the main countershaft (9) via two thrust bearing mechanisms (20, 21).

7. The multi-speed transmission according to 5, wherein the hollow countershaft is additionally supported in an axial direction on the housing via two thrust bearing mechanisms.

8. The multi-speed transmission according to 1, wherein the first bearing mechanism (15), the second bearing mechanism (17), and the fourth bearing mechanism (19) are respectively configured as a bearing that support loads that act in a radial direction and in a defined axial direction.

9. The multi-speed transmission according to 8, wherein the first bearing mechanism (15) is configured so that axial forces that act in a direction of an end of the main countershaft (9) that is directly mounted on the housing (16) can be supported in the housing (16) via the first bearing mechanism (15).

10. The multi-speed transmission according to 8, wherein the fourth bearing mechanism (19) is configured so that axial forces acting in a direction of an end of the main countershaft (9) mounted in the hollow countershaft (12) can be supported in the housing (16) via the fourth bearing mechanism (19).

11. The multi-speed transmission according to claim 8, wherein the second bearing mechanism (17) is configured so that axial forces that act respectively on one of the main countershaft (9) and the hollow countershaft (12) can be conducted via the second bearing mechanism (17) to one of the hollow countershaft (12) and the main countershaft (9), respectively.

12. The multi-speed transmission according to claim 8, wherein the third bearing mechanism (18) is a floating bearing.

* * * * *